United States Patent [19]

Sekiguchi

[11] Patent Number: 5,680,919
[45] Date of Patent: Oct. 28, 1997

[54] CLUTCH DEVICE FOR AUTOMATIC TRANSMISSION

[75] Inventor: Hiroshi Sekiguchi, Fuji, Japan

[73] Assignee: Jatco Corporation, Japan

[21] Appl. No.: 781,108

[22] Filed: Jan. 9, 1997

Related U.S. Application Data

[63] Continuation of Ser. No. 483,889, Jun. 7, 1995, abandoned.

[30] Foreign Application Priority Data

Jun. 14, 1994 [JP] Japan ................ 6-155380

[51] Int. Cl.⁶ ................................................ F16D 25/12
[52] U.S. Cl. ............................ 192/85 AA; 192/106 F
[58] Field of Search ................... 192/85 AA, 106 F, 192/85 A, 85 AB, 85 F

[56] References Cited

U.S. PATENT DOCUMENTS

| | | | |
|---|---|---|---|
| 2,740,512 | 4/1956 | Fischer | 192/85 AA |
| 3,647,037 | 3/1972 | Toma | 192/106 F |
| 3,724,626 | 4/1973 | Clauss, Jr. et al. | 192/109 F |
| 3,974,743 | 8/1976 | Ivey | 192/106 F X |
| 4,509,627 | 4/1985 | Kawamoto | 192/106 F X |
| 4,840,261 | 6/1989 | Oshidari et al. | 192/106 F |
| 5,226,517 | 7/1993 | Grochowski | 192/106 F X |

FOREIGN PATENT DOCUMENTS

| | | |
|---|---|---|
| 1-109624 | 7/1989 | Japan. |
| 2-51725 | 4/1990 | Japan. |

*Primary Examiner*—Andrea L. Pitts
*Attorney, Agent, or Firm*—Rossi & Associates

[57] ABSTRACT

A clutch device for automatic transmission comprises a rotatable high clutch drum, a ring-like piston movably fit in the high clutch drum in the axial direction, and a drift-on ball which is inserted in a staged through-hole penetrating the piston in its axial direction and is able to interrupt and communicate with the through-hole by movements thereof in the axial direction. An oil supplying and discharging port which is able to supply oil into an oil chamber partitioned by the high clutch drum and piston is formed at inner circumference of the high clutch drum. A groove which causes the oil supplying and discharging port of the high clutch drum and the through-hole to communicate with each other through a space between each inner circumference of the piston and the high clutch drum is formed at the oil chamber side of the piston.

4 Claims, 5 Drawing Sheets

CLUTCH DEVICE FOR AUTOMATIC TRANSMISSION

This is a Continuation of application Ser. No. 08/483,889 filed Jun. 7, 1995, now abandoned.

FIELD OF THE INVENTION

The present invention relates to a clutch device for automatic transmission.

BACKGROUND OF THE INVENTION

In a conventional clutch device for automatic transmission, a high clutch and a band brake are respectively connected to a hydraulic circuit which is able to supply a common 2nd-to-3rd speed changing pressure, and the hydraulic circuit is provided with an inlet orifice and an outlet orifice. Furthermore, an accumulator is provided at the high clutch and band brake side from the inlet orifice of hydraulic circuit. The accumulator lightens the speed changing shock by setting a bridging pressure (level while the second speed servo application pressure is changing at a predetermined inclination) corresponding to the line pressure supplied as an accumulator back pressure. A piston of the high clutch is provided with a drift-on ball. The drift-on ball is able to change ON and OFF according to the level of oil pressure in the high clutch. When the drift-on ball is turned on, a discharge of oil from the piston is controlled while the clutch is operating, and when the drift-on ball is turned off, the oil is discharged from the piston while the clutch is idling. Therefore, although the clutch is caused to slip and accordingly to seize as the clutch is tightened by oil pressure based on the centrifugal force given to the oil in a case where oil is accumulated in the high clutch while the clutch is idling, such a malfunction can be prevented.

The 2nd-to-3rd speed change is carried out as described below. That is, as the 2nd-to-3rd speed changing pressure is generated, the compressed oil passes through the outlet orifice, throttled by the inlet orifice and is supplied into the high clutch, thereby causing the drift-on ball to be turned on. Thus, the high clutch is tightened, and at the same time the compressed oil is supplied into a servo release chamber of the band brake to cause the band brake to be released, thereby causing the 2nd-to-3rd speed change to be executed. At this time, the bridging pressure established by the accumulator lightens the speed changing shock.

Next, the 3rd-to-2nd speed change is carried out as shown below: That is, as the 2nd-to-3rd speed changing pressure goes away, the compressed oil which was supplied into the high clutch and servo release chamber is lowered at a speed depending on the cross sectional area of the outlet orifice to release the high clutch and tighten the band brake, thereby causing the 3rd-to-2nd speed change to be carried out.

However, in such a clutch device for automatic transmission described above, as the compressed oil to be supplied into the high clutch is throttled by the inlet orifice, the supply of the compressed oil into the portion where the drift-on ball is installed is also throttled. For this reason, it takes considerable time from a stroke of the piston of the high clutch until the drift-on ball being turned on. Namely, it takes considerable time until the high clutch is tightened. Therefore, such a state that the high clutch and band brake are temporarily tightened simultaneously will occur. There may be a case where, in line therewith, torque is drawn in due to the occurrence of a four-speed state. Thereby, such a disadvantage that a large speed changing shock will be generated to make a drive uncomfortable may occur.

Furthermore, as the hydraulic circuit is throttled, the compressed oil is not released well in the high clutch when carrying out a 3rd-to-2nd speed change, and the clutch slipping time will be lengthened to cause the durability thereof to be worsened.

As the slip time of a clutch is determined by the cubic volume of oil in the oil chamber and flow rate thereof from the oil chamber, there are some types in which the clearance between the clutch drum and piston is designed to be smaller, as disclosed in Japanese utility model laid-open Nos. 1-109624 and 2-51725, in order to decrease the clutch slipping time.

Namely, a device disclosed in Japanese utility model laid-open No. 1-109624 is formed to have a body section having an annular plate-like portion and a cylindrical portion projecting from the inner circumferential edge of the annular plate-like portion, which are press-shaped, and which body section being provided with an annular stepped portion and a penetrating hole, which are formed at the circumferential edge of the annular plate-like portion. The device also comprises a portion for accommodating a check ball engaged with the penetrating hole formed at the body section; and a plate-like member which is formed to be annular and connected to the annular plate-like portion of the body section and whose outer circumferential edge forms an annular sealing groove together with the annular staged portion provided at the body section. And the plate-like member is made so that a part of the inner circumferential edge partially covers an opening end at the check ball accommodating portion and prevents the check ball from escaping from the check ball accommodating portion.

Furthermore, a device disclosed in Japanese utility model laid-open No. 2-51725 comprises an oil pressure chamber formed by a clutch drum and a clutch piston; a communicating port which is installed at the clutch piston and communicates with the outside of the oil pressure chamber; and a drift-on ball which interrupts the communicating port to actuate the oil pressure for actions of the clutch and opens the communicating port to discharge the oil pressure to make the clutch free, wherein the communicating port is provided with an auxiliary path which is caused to slightly communicate with the outside to such a degree as not to influence the oil pressure action to actuate the clutch even though the drift-on ball is located at the position for interrupting the communicating port.

However, in both the devices disclosed in Japanese utility model laid-open Nos. 1-109624 and 2-51725, the clearance between the clutch drum and piston is designed to be made as small as possible. As a result, this part will be throttled. Therefore, problems such as torque draw-in and worsening of clutch durability will not be solved.

SUMMARY OF THE INVENTION

It is therefore an object of the invention to provide a clutch device for automatic transmission, in which a ring-like shaped piston is movably fit in a double-cylindrical cylinder portion of a clutch drum, and an inner circumference of the piston and an inner circumference of the cylinder portion face to each other forming a space therebetween, at the piston is formed a groove which causes the oil supply and discharge port of clutch drum to communicate with the through-hole of the piston into which a drift-on ball is inserted, whereby the flow path is made wide at the groove portion to cause the flow resistance of the oil chamber to be decreased, and when the clutch is tightened, the commencement of oil pressure actuation is made faster. Therefore, as the time from a speed change order being issued until the clutch being tightened will be shortened, the unevenness of the clutch tightening timing is much decreased. Thereby, such problems that both the clutch and band brake are simultaneously tightened, and that the torque draw-in occurs to cause a large speed changing shock to be generated will be able to be prevented. Therefore, the feeling of driving will be much improved.

It is another object of the invention to provide a clutch device for automatic transmission, in which, as oil is positively supplied into the through-hole of piston along the groove, the drift-on ball is able to be turned on in a short time by issuing a speed change order, whereby as the clutch slipping time is shortened, the clutch heating is suppressed to cause the durability thereof to be improved.

It is a further object of the invention to provide a clutch device for automatic transmission, in which, when releasing the clutch, the oil in the oil chamber is caused to positively flow in the oil supplying and discharging port and the through-hole of piston through the groove, and the oil is quickly discharged therethrough, whereby as the time from a speed change order being issued until the clutch being released will be shortened, the clutch slipping time is shortened to cause the durability of the clutch to be much improved.

In order to solve various problems in the prior art and to achieve the above objects, the outline of a typical clutch device for automatic transmission is explained below.

According to the invention, a clutch device for automatic transmission comprises: a rotatable clutch drum (10); a piston (12) movably fit in a cylinder portion of the clutch drum in the axial direction; and a drift-on ball which is inserted in a staged through hole (12a) penetrating in the axial direction of the piston and causes the through-hole (12a) to be interrupted and to communicate by the movement thereof in the axial direction; and is characterized in that an inner circumference of the piston and an inner circumference of the cylinder portion face to each other forming a space (22) therebetween, an oil chamber (14) partitioned by the clutch drum (10) and the piston (12) is formed, an oil supplying and discharging port (10b) which is able to supply oil into the oil chamber (14) is formed at the clutch drum(10), and a groove (12b) which causes the oil supplying and discharging port (10b) of clutch drum (10) and the through-hole (12a) to communicate with each other through the space is formed at the oil chamber (14) side of the piston (12).

The reference numbers in the brackets indicate the respective corresponding members of preferred embodiments described later.

When the 2nd-to-3rd speed change order is issued, a clutch tightening action is commenced. That is, oil is supplied into the oil chamber. As the oil supplied into the oil chamber easily flows due to a lower flow resistance at the groove provided at the piston in comparison with the other sections, it is caused to flow into the through-hole of the piston through the groove. Thus, as oil is positively supplied into the through-hole, the drift-on ball is caused to move to the position where the through-hole is interrupted, at a stage where the oil pressure in the oil chamber is less than in the conventional types. Therefore, the piston is caused to move to the position where the high clutch is completely tightened in a shorter time from issuing a speed changing order, compared with the conventional types.

As described above, by decreasing the flow resistance at the groove, the flow resistance in the oil chamber is also decreased to cause the commencement of oil pressure actuation to be made faster, whereby the time from a speed changing order being issued to the high clutch being tightened is shortened. Accordingly, unevenness of the clutch tightening timing is reduced. And such problems that the clutch and band brake are simultaneously tightened, and as a result a large speed changing shock occurs in line with a torque draw-in will be eliminated. Therefore, a comfortable drive will be able to be obtained. In addition, as oil is positively supplied into the through-hole of the piston through the groove, the drift-on ball is able to interrupt the through hole in a short time from issuing a speed changing order. Thereby, the clutch sliding slipping time is shortened to accordingly suppress the heating thereof. Thus, the durability of the clutch will be much improved.

Next, when the 3rd-to-2nd speed changing order is issued, a clutch releasing action is carried out. Namely, oil is discharged from the oil chamber. At this time, as the flow resistance of the groove is small, the oil in this portion is discharged faster than oil in the other part of the oil chamber. Therefore, as the oil in the through-hole of the piston is positively discharged, the drift-on ball is caused to move to a position where the through-hole communicates with the oil chamber, in a short time from issuing a speed changing order. Thereby, after the through-hole communicates with the oil chamber, the oil in the oil chamber flows not only from the oil supplying and discharging port of the high clutch drum but also into the through-hole of the piston through the groove by a centrifugal force due to rotations of the clutch drum, and the oil is discharged through the through-hole of the piston. Therefore, the piston moves to the position where the clutch is completely released.

As described above, the oil in the oil chamber is positively discharged by a groove of the piston to accelerate the discharge oil. Thereby, the clutch slipping time reduced to cause the clutch durability to be much improved.

And, since there is a ring space between the inner circumference of the piston and inner circumference of the cylinder portion, if the through-hole of the piston has place at any position against the oil supplying and discharging port of the clutch drum in operation, a smooth oil flow between the through-hole and the oil supplying and discharging port is obtained through the ring space.

BRIEF DESCRIPTION OF THE DRAWINGS

Other features and advantages of the invention will be apparent from the following description taken in connection with the accompanying drawings wherein.

DETAILED DESCRIPTION OF THE PREFERRED EMBODIMENTS

Figure 1:
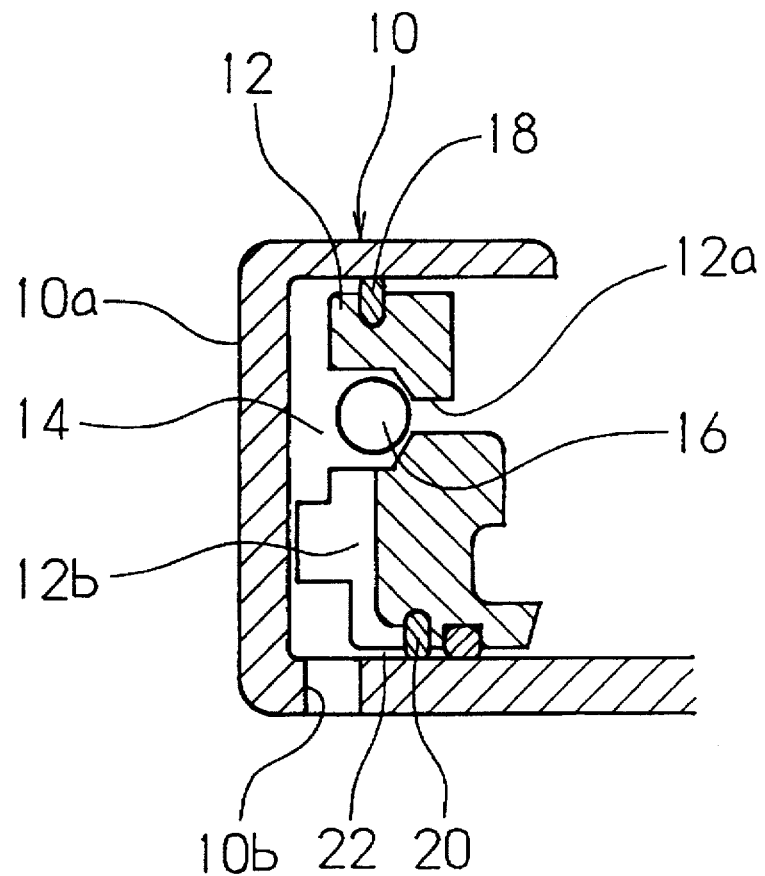
FIG. 1 is a view showing a first preferred embodiment of the invention.
Figure 2:
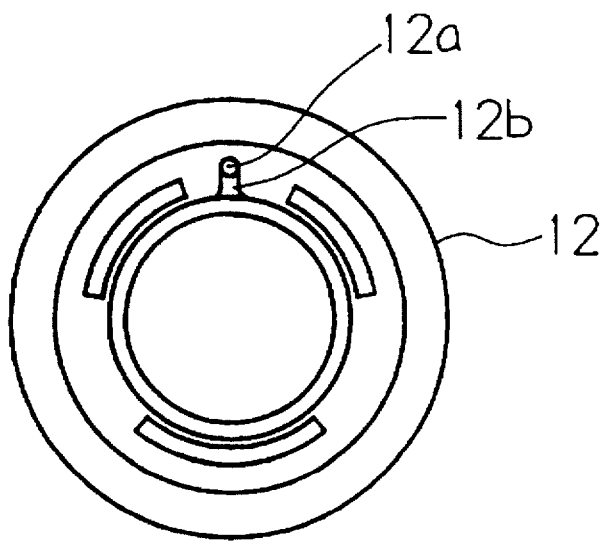
FIG. 2 is the front elevational view of a piston according to the first preferred embodiment.
Figure 3:
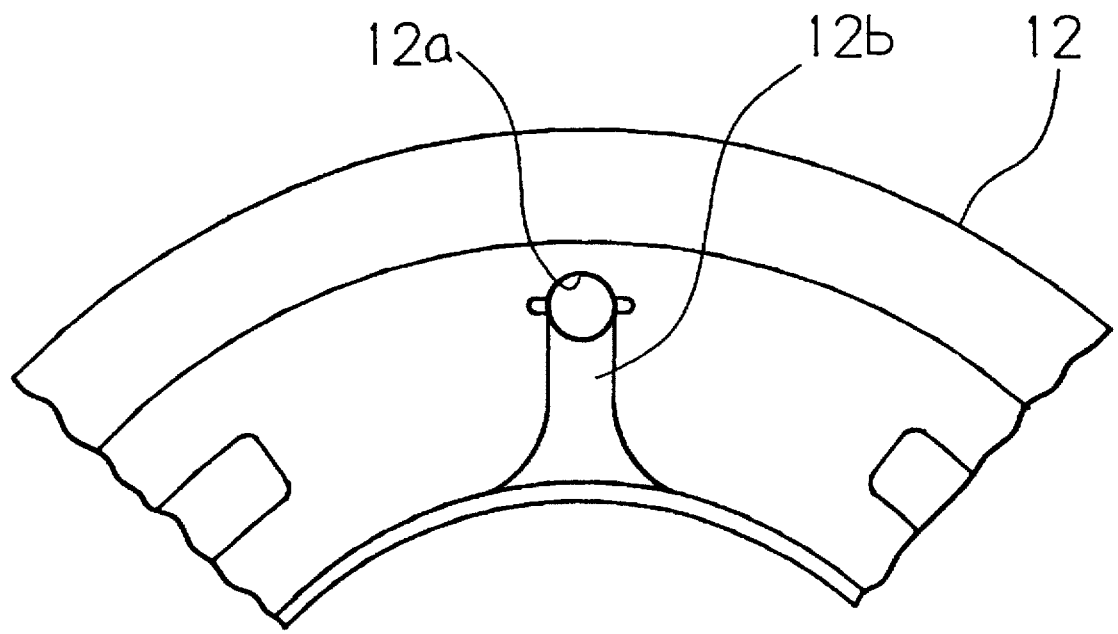
FIG. 3 is a view showing a portion at which a piston groove of the first preferred embodiment is formed.

FIG. 1, FIG. 2, FIG. 3 and FIG. 4 show a first preferred embodiment of the invention. A cylindrical piston 12 is inserted into a double-cylindrical cylinder 10a consisting of a high clutch drum (H/C drum) 10. The outer and inner circumferential portions of the piston 12 is enclosed by sealing members 18 and 20. The inner circumference of the piston and an inner circumference of the cylinder portion face to each other forming a space 22 therebetween. This space 22 has a ring-like shape, and surrounds the inner circumference of the cylinder portion. It is possible to supply compressed oil from an oil supplying and discharging port 10b formed at the inner cylindrical portion of the cylinder 10a into an oil chamber 14 partitioned by the cylinder portion 10a and piston 12. The piston is provided with a through-hole 12a which passes through the piston in the axial direction thereof. The through-hole 12a is formed to be larger in diameter than that of a drift-on ball 16 described later from the oil chamber 14 side end portion to a predetermined position in the axial direction and to be smaller in diameter than the drift-on ball diameter from the predetermined position to the end portion opposite to the oil chamber 14 side. Thereby, it is possible for the drift-on ball 16 to interrupt the through-hole 12a by contacting the small-diametered portion of the through-hole 12a of the piston 12. As shown in FIG. 2, a groove 12b is formed at the oil chamber 14 side of the piston 12 from the through-hole 12a toward the inner circumference thereof. The groove 12b of the piston 12 has, as shown in FIG. 3, the same width as that of the through-hole 12a from the through-hole 12a to a predetermined position in the diametrical direction and is widened from the predetermined position in the diametrical direction toward the inner circumference, drawing an arc. Furthermore, the groove 12b of the piston 12 is concave in the cross-section thereof, and the depth from the through-hole 12a to the inner circumference of the piston 12 is constant. The piston 12 is disposed so that the groove thereof is located at the same position as the oil supplying and discharging port of the high clutch drum 10 in the diametrical direction. The drift-on ball 16 is inserted into the through-hole 12a of the piston 12 and is movable in the axial direction. The oil supplying and discharging port 10b of high clutch drum 10 is connected to a hydraulic circuit (not illustrated) which is provided with orifices and an accumulator.

Next, the actions of the first preferred embodiment will be described below.

When a 2nd-to-3rd speed change is ordered, an action for tightening the high clutch is commenced. That is, oil is supplied into the oil chamber 14 through an oil supplying and discharging port 10b of the high clutch drum 10. The oil supplied into the oil chamber 14 flows easily as the flow resistance in the groove 12b of the piston 12 is made smaller than that of the other portions. Therefore, oil flows to the through-hole 12a of the piston 12 through the groove 12b of the piston 12. Thus, as oil is positively supplied into the through-hole 12a, the drift-on ball 16 is turned on (closed) at a stage where the oil pressure of the oil chamber 14 is smaller than in the conventional types (namely, the drift-on ball moves to the position wherein the through-hole 12a is interrupted), whereby the piston 12 is caused to move to the position where the high clutch is completely tightened, in a shorter time than in the conventional types.

As described above, by providing a groove 12b in the piston 12 and decreasing the flow resistance of this portion, the flow resistance of the oil chamber 14 is also decreased to cause the commencement of oil pressure action to be made earlier and to cause the time from a speed change being ordered to the high clutch being tightened to be shortened. Thereby, unevenness of the tightening timing of high clutch is remarkably reduced. As a result, such problems that the high clutch and band brake are simultaneously tightened (in the fourth speed state) at a time, and a large speed changing shock occurs due to torque draw-in will be prevented, and a comfortable drive feeling will be secured. Furthermore, as oil is positively supplied into the through-hole 12a of the piston 12 through the groove 12b of the piston 12, it is possible for the drift-on ball to be turned on in a short time after a speed change order is issued. Therefore, as the high clutch slipping time is shortened and the heating of the high clutch is suppressed, the durability thereof is much improved Furthermore, an orifice of the hydraulic circuit can be throttled to such a degree that the resistance of the oil chamber 14 is decreased, thereby causing the bridging pressure to be increased. Accordingly, it is possible to make the accumulator small-sized. Furthermore, it is also possible to prevent an engine from high rotation which may be caused due to that a band brake release is carried out relatively earlier than a tightening of high clutch.

Next, when a 3rd-to-2nd speed change is ordered, an action for releasing the high clutch is commenced. Namely, the oil of the oil chamber 14 is discharged through the oil supplying and discharging port 10b of the high clutch drum 10. At this time, as the flow resistance of the groove 12b of the piston 12 is small, the oil in this portion is discharged earlier than oil in the other portions of the oil chamber 14. Therefore, as oil in the through-hole 12a of the piston 12 is positively discharged, the drift-on ball 16 is turned off in a shorter time after a speed change order (namely, the drift-on ball moves to the position where the through-hole is caused to communicate with the oil chamber). Thereby, after the drift-on ball 16 is turned off, oil in the oil chamber 14 is discharged from the oil supplying and discharging port of the high clutch drum 10 and flows into the through-hole 12a of the piston 12 along the groove 12b of the piston 12 due to a centrifugal force of the rotating high clutch drum 10 to cause the oil to be discharged from the through-hole 12a of the piston. For this reason, the piston 12 is caused to move to the position where the high clutch is completely released, in a shorter time than in the conventional types.

And even if the through-hole 12a of the piston has place at any position against the oil supplying and discharging port 10b of the clutch drum, a smooth oil path between the groove and the oil supplying and discharging port is obtained through the ring space 22.

As described above, oil in the oil chamber 14 is caused to positively flow into the oil supplying and discharging port 10b of the high clutch drum 10 and into the through-hole 12a of the piston 12 for discharge. Therefore, the oil discharge is made faster. As a result, the time from a speed change being ordered to the high clutch being completely released is shortened to cause the slipping time of the high clutch to be reduced. Therefore, the clutch durability will be much improved. Furthermore, as the returning of the piston will be accelerated, the behavior of a continuous speed change of, for example, changing from the 2nd speed to the 3rd speed, and changing back to the 2nd speed, will be stabilized Furthermore, it is possible to shape a groove formed in the piston not only as shown in the above first preferred embodiment but also as shown in FIG. 5 to FIG. 8.

Figure 5:
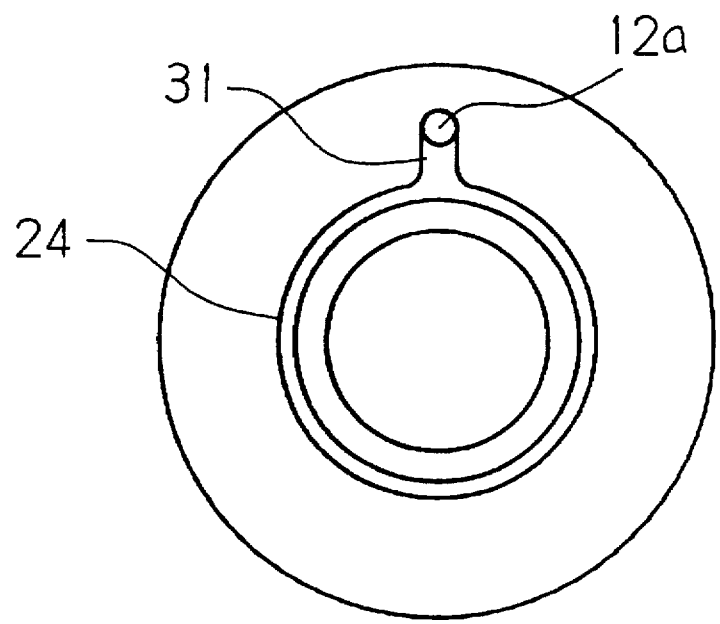
FIG. 5 is a view showing a second preferred embodiment of the invention.

As shown in FIG. 5, in a case where a ring-like groove 24 is provided along the inner circumference of the piston and the ring-like groove 24 is caused to communicate with the through-hole 12a through a groove 31 in place of the groove 12b, it is easy to collect oil in the oil chamber.

Figure 6:
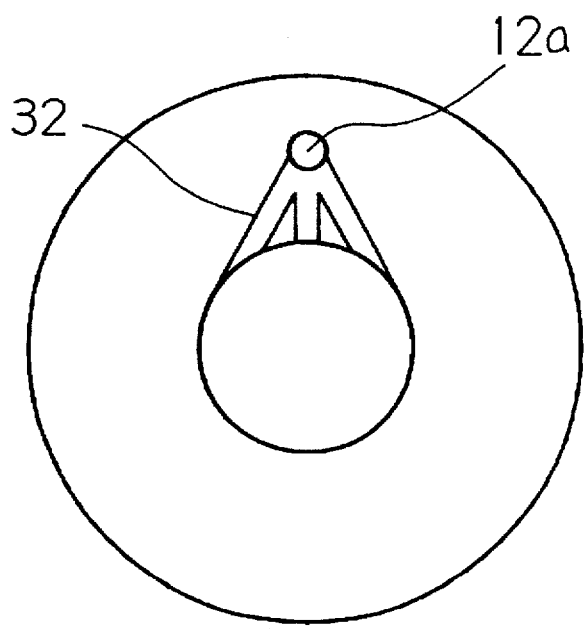
FIG. 6 is a view showing a third preferred embodiment of the invention.

FIG. 6 shows still another type in which three linear grooves 32 radially extending from the through-hole 12a of the piston to the inner circumference thereof is provided in place of the groove 12b. Thereby, the oil flow into the through-hole 12a is increased mainly by a groove having a small flow resistance according to the rotation direction of the high clutch drum or the change based on acceleration and/or deceleration of a speed.

Figure 7:
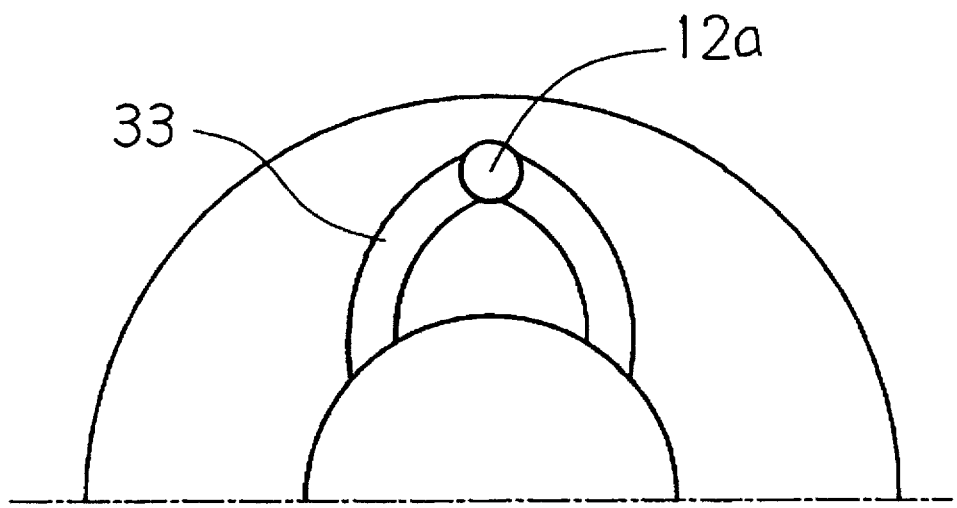
FIG. 7 is a view showing a fourth preferred embodiment of the invention.

Furthermore, FIG. 7 shows such a type that two grooves 33 arcuately extending from the through-hole 12a of the piston to the inner circumference are provided in place of the groove 12b. Each of the arcuate grooves are convex-shaped in a mutually parting direction. The point where each of them is connected to the inner circumference of the piston is spaced at the opposite side from a line connecting the piston center to the through-hole. Thereby, the grooves are able to correspond to the rotation direction of high clutch or changes based on acceleration and/or deceleration of a speed. Furthermore, as the grooves 33 are arcuately shaped, further smoother oil flow is able to be secured in comparison with the linear grooves.

Figure 8:
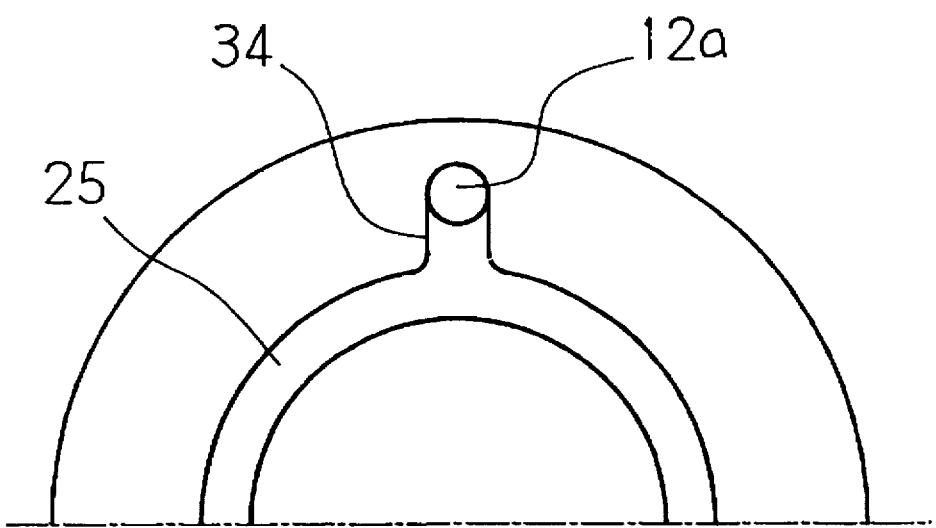
FIG. 8 is a view showing a fifth preferred embodiment of the invention.
Figure 9:
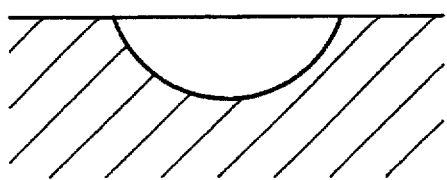
FIG. 9 is a view showing a sixth preferred embodiment of the invention.
Figure 10:
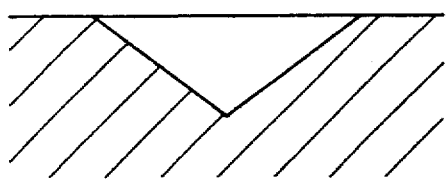
FIG. 10 is a view showing a seventh preferred embodiment of the invention.
Figure 11:
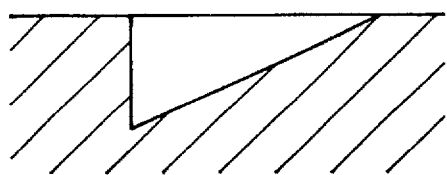
FIG. 11 is a view showing an eighth preferred embodiment of the invention.
Figure 12:
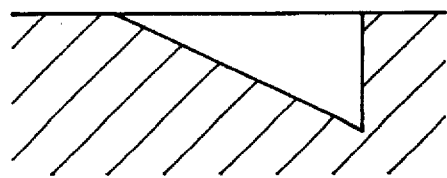
FIG. 12 is a view showing a ninth preferred embodiment of the invention.

Furthermore, FIG. 8 shows such a type that a ring-like groove 25 is provided along the inner circumference of the piston as in FIG. 5. The ring-like groove 25 is connected to the through-hole 12a through a groove 34. However, in this case, a ring-like groove 25 is continuously provided especially on the inner circumferential surface of the piston, whereby even if the general surface of the top wall of the piston facing the oil chamber is considerably overlapped with the oil supplying and discharging port 10b in the axial direction, it is possible for the ring-like groove 25 to be fully connected to the caliber of the oil supplying and discharging port 10b. Therefore, it is easy to collect oil and it is possible to make the oil chamber narrow. Furthermore, it is possible to shorten the length of the clutch device itself in the axial direction.

Figure 4:
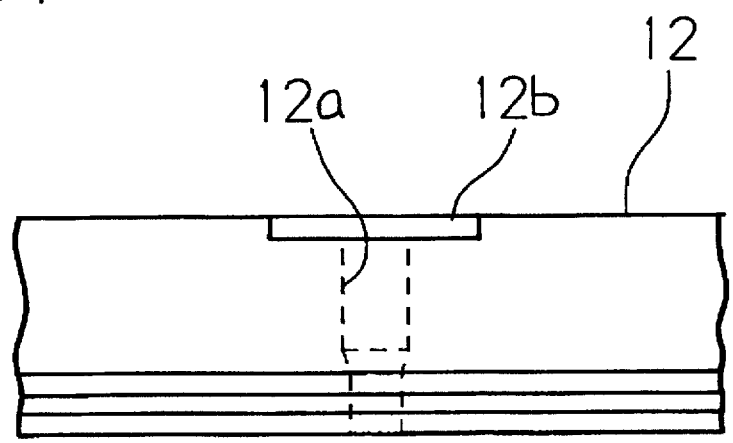
FIG. 4 is a cross-sectional view of the groove according to the first preferred embodiment.

The cross-section of the piston groove is not limited to that shown in FIG. 4 showing the first preferred embodiment but may be of various shapes shown in FIG. 9 to FIG. 12.

What is claimed is:

1. A clutch device for an automatic transmission comprising:
   a rotatable clutch drum having a double-cylindrical cylinder portion;
   a piston having a ring-like shape and movably fit in said double-cylindrical portion in the axial direction; and
   a drift-on ball which is inserted in a staged through-hole penetrating the piston in its axial direction and is able to interrupt and communicate with the through-hole by movements thereof in the axial direction;
   wherein an inner circumference of said piston and an inner circumference of said cylinder portion face each other forming a space therebetween, an oil chamber partitioned by the clutch drum and piston is formed, an oil supplying and discharging port which supplies oil into the oil chamber and discharges the same therefrom is formed at the inner circumference of said cylinder portion, and a groove which causes said oil supplying and discharging port and said through-hole to communicate with each other through said space is provided at an oil chamber side of the piston;
   wherein a width of a through-hole end of the groove is not larger than the diameter of the through-hole; and
   wherein the groove extends across a face of the piston from the through-hole to the inner circumference of the piston to permit direct communication between the inner circumference of the piston and the through-hole.

2. A clutch device for an automatic transmission set forth in claim 1, wherein said groove extends in the radial direction between the inner circumference of the piston and the through-hole, and at the same time the width of the groove is widened from a predetermined position in the radial direction toward the inner circumference.

3. A clutch device for an automatic transmission set forth in claim 1, wherein said groove has a plurality of linear grooves radially formed from the through-hole toward the inner circumference of the piston.

4. A clutch device for an automatic transmission comprising:
   a rotatable clutch drum having a double-cylindrical cylinder portion;
   a piston having a ring-like shape and movably fit in said double-cylindrical portion in the axial direction; and
   a drift-on ball which is inserted in a staged through-hole penetrating the piston in its axial direction and is able to interrupt and communicate with the through-hole by movements thereof in the axial direction;
   wherein an inner circumference of said piston and an inner circumference of said cylinder portion face each other forming a space therebetween, an oil chamber partitioned by the clutch drum and piston is formed, an oil supplying and discharging port which supplies oil into the oil chamber and discharges the same therefrom is formed at the inner circumference of said cylinder portion, and a groove which causes said oil supplying and discharging port and said through-hole to communicate with each other through said space is provided at an oil chamber side of the piston; and
   wherein said groove comprises two arcuate grooves each disposed at a side opposite to a line connecting the center of the piston with the through-hole, and which are convex in a mutually separating direction connecting a point of said inner circumference spaced from said line with the through-hole, and wherein a width of through-hole ends of said arcuate grooves are not larger than the diameter of the through-hole.

* * * * *